May 27, 1930.  E. T. PARSONS  1,760,280
ROLL MOLDING MACHINE
Filed June 20, 1928  3 Sheets-Sheet 1

INVENTOR
Edward T. Parsons
BY
Everett H. Cook
ATTORNEYS

May 27, 1930. E. T. PARSONS 1,760,280
ROLL MOLDING MACHINE
Filed June 20, 1928 3 Sheets-Sheet 2
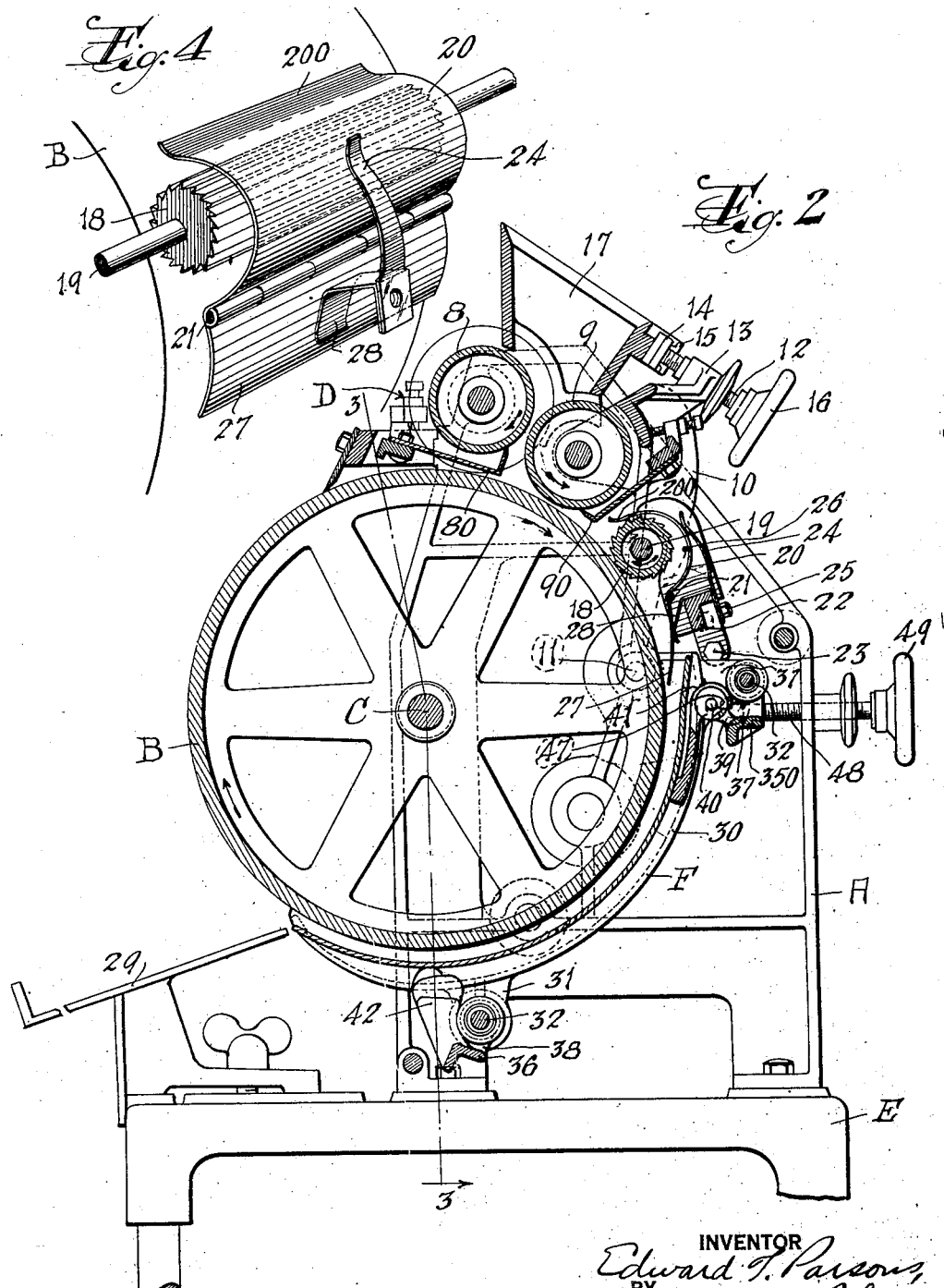
INVENTOR
Edward T. Parsons
BY
Everett H. Cook
ATTORNEYS

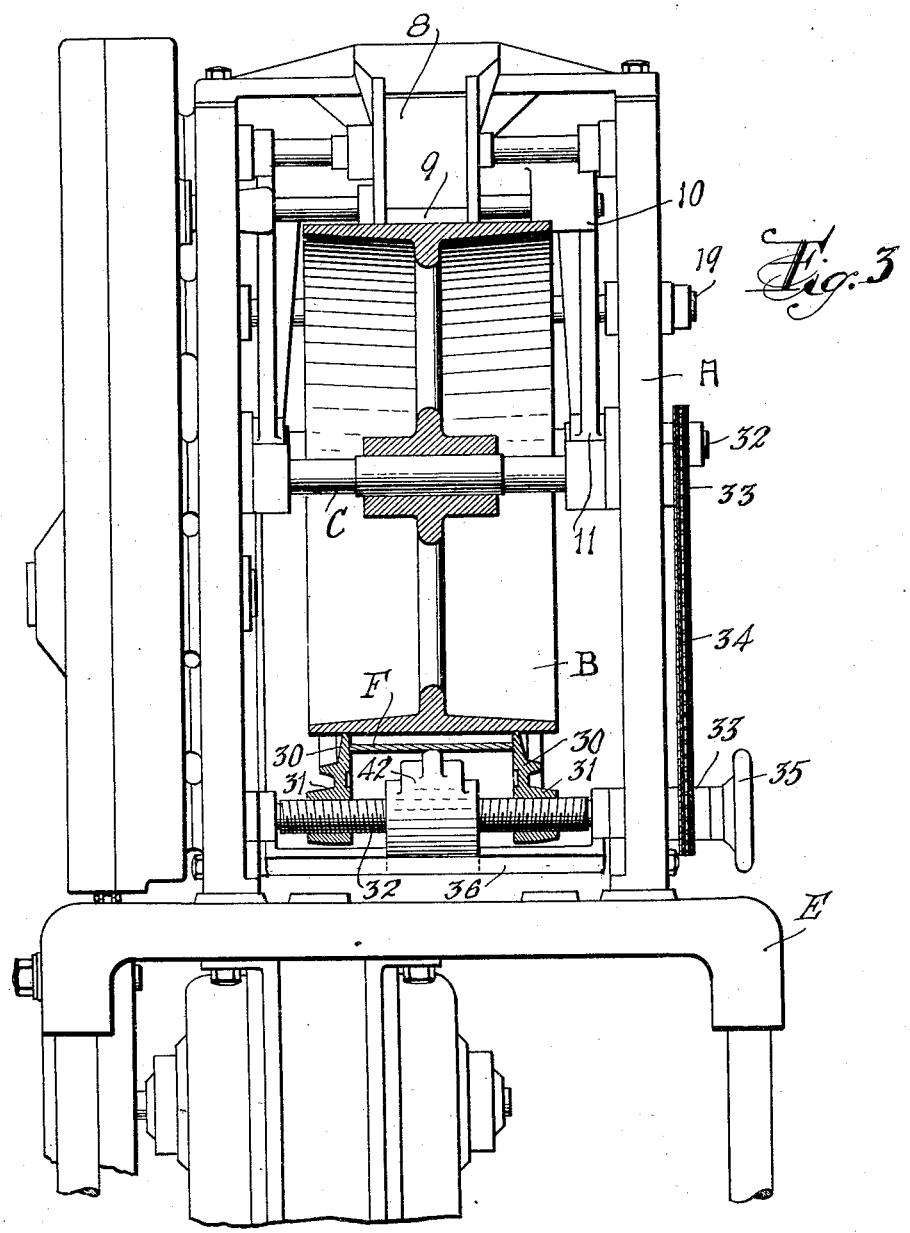

Patented May 27, 1930

1,760,280

UNITED STATES PATENT OFFICE

EDWARD T. PARSONS, OF UPPER MONTCLAIR, NEW JERSEY, ASSIGNOR TO THOMSON MACHINE COMPANY, A CORPORATION OF NEW JERSEY

ROLL-MOLDING MACHINE

Application filed June 20, 1928. Serial No. 286,853.

This invention relates in general to a dough molding machine of the type described in United States Patent No. 701,646, to C. A. Thomson, June 3, 1902, in which a ball or lump of dough is first rolled between driven rollers into a thin sheet which is subsequently automatically spirally rolled to form a substantially cylindrical loaf, said loaf being then subjected to a rolling and squeezing pressure between a rotating drum and an arcuate compression plate to knead or work the dough into proper condition for the pan. More particularly the invention relates to a machine of the type shown in Patents Nos. 953,177, dated March 29, 1910, and 1,542,833, dated June 23, 1925, especially designed for molding rolls as distinguished from loaves.

One object of the present invention is to provide a novel and improved mechanism for curling the sheet of dough and forming it into a spirally wound cylindrical roll.

Another object is to provide such improved curling mechanism including a novel and improved construction and combination of a fluted roller and a spring influenced curling plate in spaced relation to the periphery of said roller so that the fluted roller initially turns back or curls the forward end of the sheet of dough and then carries the spiral roll between the periphery of the roller and said curling plate against the influence of the spring, whereby the sheet is formed into a cylindrical roll which is then deposited into the space between the kneading drum and the compression plate.

Other objects are to provide such a construction wherein the spring influenced curling plate is adjustable relatively to the periphery of the fluted or curling roller; to provide a novel and improved construction wherein a spring influenced guide plate is provided for guiding the cylindrical roll into proper relation to the kneading drum and compression plate, and to obtain other advantages and results as will be brought out by the following description.

Referring to the drawings in which the same reference characters designate corresponding and like parts throughout the several views, Figure 1 is a front elevation of the roll molding machine embodying my invention.

Figure 2 is a transverse vertical sectional view taken on the line 2—2 of Figure 1.

Figure 3 is a transverse vertical sectional view taken on the line 3—3 of Figure 2, and Figure 4 is a detached perspective view of the sheet curling and roll forming mechanism.

Figure 1:
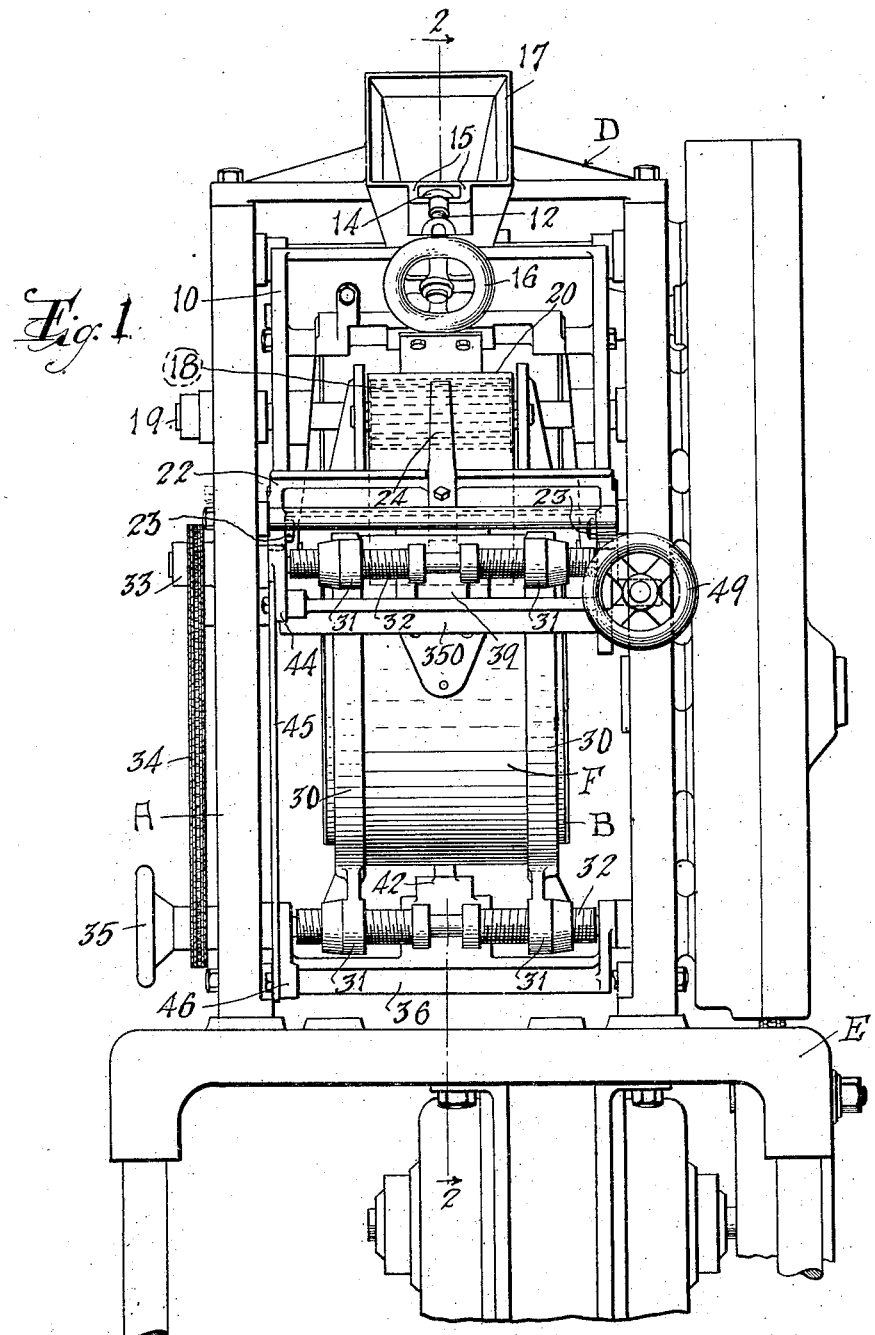

In the specific embodiment of the invention shown on the drawings, the reference character A designates the main frame of a dough molding machine of known type, for example as shown in Patent No. 1,542,833, dated June 23, 1925, on one end of which is journaled a kneading drum B on a transverse shaft C, one side of said drum being positioned adjacent a dough sheeting and roll forming mechanism D mounted at the end of the frame opposite the drum. The main frame A may be supported on a bench or on a table E in convenient position for operation.

The drum B may be driven in any suitable manner for example as shown in said patent. This drum cooperates with an arcuate compression plate F which is spaced from the periphery of the drum and is adapted to receive between itself and the drum the roll which is formed by the dough sheeting and roll forming mechanism D.

The said dough sheeting and roll forming mechanism includes a pair of spaced parallel rollers 8 and 9 one of which is journalled in the frame A and the other of which, in the present instance the roller 9, is journaled in an adjustable frame 10 whereby said roller 9 may be moved toward and away from the roller 8 to vary the space therebetween. In the present instance the frame 10 is substantially U-shaped and has the extremities of its arms pivotally connected at 11 on horizontal axes to the frame A, whereby movement of the frame 10 about the pivots 11 moves the roller 9 toward and from the roller 8. For adjusting the frame 10, I may utilize a screw 12 threaded in the frame 10, as at 13, and carrying a swivel collar 14 arranged between two spaced lugs 15 on the frame A. Obviously rotation of the screw 12 by the hand wheel 16 will swing the frame 10 toward and from the roller 8, the extent of rotation of the screw determining the distance between the rollers 8 and 9. A hopper 17 is mounted on the frame A above the rollers 8 and 9 to receive a lump or ball of dough and guide the same between said rollers. The rollers 8 and 9 are intergeared and driven together so as to force the dough between them, in any suitable manner. The dough passing between the rollers is formed into a sheet, and the roller 9 is also so arranged with respect to the drum B that said sheet of dough is again acted upon and thinned between said roller 9 and the drum. Scrapers 80 and 90 are provided for stripping the dough sheet from the respective rollers 8 and 9. The sheet is then operated upon by a curling and roll forming mechanism which spirally rolls the sheet into substantially cylindrical form.

This roll forming mechanism includes a fluted sheet curling roller 18 journaled on a shaft 19 in the frame A with its periphery in slightly spaced relation to the periphery of the drum B. This curling roller is driven in any suitable manner to rotate in the direction of the arrow in Figure 2 and is located adjacent the cooperating points of the roller 9 and the drum. At the outer side of the curling roller and in spaced relation to the periphery thereof is arranged a spring curling plate 20 which consists of a sheet of metal substantially semi-circular in cross section of a diameter greater than that of the curling roller and hinged at one end on a pintle 21 upon an H-shaped frame 22 mounted upon opposite sides of the frame A by cap-screws 23, so that the curling plate is mounted in eccentric relation to the curling roller. The free end of the curling plate, that is, the end nearest the curling roller, is bent outwardly from the periphery of the curling roller as at 200 and is normally in spaced relation to said roller, the other portions of the curling plate being spaced gradually greater distances from the periphery of the curling roller to the hinge 21 to compensate for the increasing diameter of the loaf as the sheet is rolled. The curling plate is normally influenced toward the curling roller by a leaf-spring 24, one end of which is secured by a screw 25 to the frame 22 at substantially the center thereof so as to exert only sufficient pressure on the loaf to produce the necessary friction to cause the sheet to be rolled; and such movement of the curling plate is limited by stop-pins 26 on the arms of the frame 22. Also hinged at 21 is a guide plate 27 which depends from the frame 22 to a point between the drum B and the compression plate F, the free end of said guide plate being normally influenced toward the drum by a leaf-spring 28 also connected to the frame 22 by the screw 25, so that the free end of said guide plate is normally spaced from the drum a distance less than the diameter of the loaf.

In operation of the apparatus so far described a ball of dough is deposited in the hopper 17 and is drawn downwardly between the rollers 8 and 9 and formed into a sheet. The forward end of the sheet is carried by the periphery of the drum B between it and the roller where the sheet is again operated upon and thinned. Movement of the forward end of the sheet is continued by the drum B to the periphery of the curling roller 18 which turns or curls back the end of the sheet and initiates a spiral rolling action which is continued by the simultaneous rotation of the drum B and the curling roller. When the sheet has been thus partially rolled into a spirally rolled cylinder its diameter is such that it is pressed against the free end 200 of the curling plate 20. This causes the roll to be more firmly pressed against the periphery of the curling roller so that the curling roller raises the roll of dough upwardly on its periphery into the space between the periphery of the roller and the curling plate. The curling plate being a dead surface and the roller constantly rotating the spiral rolling of the sheet is continued between the roller and said plate under the yielding influence of the spring 24 which prevents the dough being crushed or "killed" during the curling operation and avoid breaking or roughening of the skin of the loaf. The roll is then deposited by action of gravity from the hinged end of the curling plate into the space between the drum B and the guide plate 27. The guide plate causes the roll to fall with its axis parallel with the axis of the drum and exerts the desired yielding pressure on the roll to cause it to be presented to the compression plate F in the proper manner. The roll is then kneaded between the periphery of the drum B and the compression plate F and discharged at the end of the compression plate onto a panning conveyor or suitable tray 29. By loosening the cap screws 23, the frame 22 may be swung about said screws as an axis toward and from the curling roller 18 so as to vary the distance between said roller and the curling plate 20.

The machine preferably includes means for mounting and simultaneously adjusting end flanges for the compression plate F and kneading drum B so as to limit the length of the rolls and adapt the machine for producing rolls of different lengths. To this end adjustable flanges 30 are provided for the drum at opposite sides of the compression plate, and are movable longitudinally of the drum to accommodate compression plates of different widths. The compression plate being arcuate, the flanges 30 are also arcuate and of substantially the same length as the compression plate. The flanges will be of a thickness somewhat greater than the maximum thickness of the rolls to be produced. These flanges may be formed of cast metal and have one surface thereof concentric with the drum B. The ends of the flanges are provided with radially projecting lugs 31 having transverse openings screw-threaded upon screw rods 32 rotatable in the frame A and extending transversely thereof, said rods and lugs being so relatively positioned that the flanges are slightly spaced from the periphery of the drum B so that there is no frictional contact between the drum and the flanges. The opposite ends of the screw rods 32 are oppositely threaded, and obviously therefore, simultaneous rotation of the screw rods will cause simultaneous movement of the flanges 30 longitudinally of the drum in opposite directions. For the purpose of simultaneously rotating the screw rods I may provide sprockets 33 on the ends of the rods projecting from the outer sides of the frame A and connect them with a chain 34, one of the rods may be provided with a hand-wheel or the like 35 and obviously by rotation of said hand-wheel and through the chain sprocket connections 33, 34, both rods 32 will be rotated at the same time so as to move the flanges 30 simultaneously toward or away from each other according to the direction of rotation of the rods.

It will be understood that the compression plate F is adjustable toward and from the periphery of the drum by any suitable means, and as shown this means comprises two substantially U-shaped bars 350 and 36, the arms of which are provided with the respective bearing lugs 37 and 38 pivotally mounted on the respective rods 32, whereby said bars may oscillate on said rods at pivots. The uppermost one of said bars, in the present instance the bar 350, is provided substantially centrally of its length with a laterally projecting arm 39 which carries studs 40 projecting from opposite sides thereof and substantially parallel to the bar. The upper end of the compression plate is provided with two downwardly facing hooks 41 spaced transversely of the compression plate and adapted to engage the studs 40 on the arm 39 to support said upper end of the compression plate. The lower end of the compression plate is supported by an upwardly extending lug 42 arranged substantially centrally of the length of the lowermost bar 36, the end of the lug being rounded to permit of a rocking action relative to the compression plate. The uppermost bar 350 is also provided at one end with a projection 44 which is connected by a link 45 to an arm 46 extending downwardly and rearwardly from one end of the lowermost bar 36. With this construction, it will be obvious that oscillation of the bars 350 and 36 about the rods 32 will cause the compression plate to be moved toward and from the periphery of the drum, and the link 45 ensures simultaneous movement of the two bars 350 and 36. For the purpose of rocking the bars 350 and 36, I may provide the uppermost bar 350 with a stud 47 projecting longitudinally from one end of the bar eccentrically to the shaft 32 and engaged by one end of a screw 48 threaded in the frame A and carrying a hand wheel 49. Action of gravity on the compression plate will tend to rock the bars 350 and 36 to permit the compression plate to move away from the drum when the screw 48 is moved outwardly, while when the screw 48 is moved inwardly against the stud 47 the compression plate will be forced toward the periphery of the drum. One compression plate can be removed by lifting the hooks 41 from the studs 40 and pulling the plate upwardly and outwardly whereupon another compression plate of different width may be substituted if desired.

While I have shown my invention embodied in certain details of construction it will be understood that this is primarily for the purpose of illustrating the principles of my invention and that many modifications and changes may be made in the details of construction without departing from the spirit or scope of the invention.

Having thus described my invention, what I claim is:

1. In a dough molding machine, a main frame, a dough sheeting mechanism on said frame, a loaf-forming mechanism comprising a pair of members having portions of their surfaces adjacently disposed and movable in opposite directions, one of which is a roller, to cooperate with each other to curl the forward edge of a sheet of dough from said dough sheeting mechanism, a supplemental frame pivotally mounted at one end on said main frame to swing toward and from said roller, a substantially semi-circular curling plate partially surrounding said roller in spaced and eccentric relation thereto at the side thereof opposite the other of said surfaces to receive the curled edge of the dough sheet between said roller and the end of said curling plate nearest the roller and spirally roll said sheet into a loaf, means for hingedly mounting said curling plate at its other end on said supplemental frame to bodily swing toward and from said roller, said eccentric relation of the curling plate to said roller compensating for the increase in diameter of the loaf as the sheet is rolled, and means mounted on said supplemental frame for influencing said curling plate toward said curling roller so that said curling plate can yield away from said roller and exert only such pressure on the loaf as to cause the necessary friction to cause the sheet to be rolled.

2. The dough molding machine set forth in claim 1 with the addition of a loaf kneading mechanism including the other of said members and a compression plate arranged in spaced relation to the surface thereof to receive a loaf therebetween, a guide plate hinged at one end upon said supplemental frame adjacent the discharge side of said loaf forming mechanism to direct a loaf into the space between said member and said compression plate, and a spring having one end connected to said supplemental frame and the other end bearing upon said guide plate to influence the other end of said guide plate toward said surface of said movable member into a position spaced from said surface a distance less than the diameter of said loaf.

EDWARD T. PARSONS.